Figure 1:
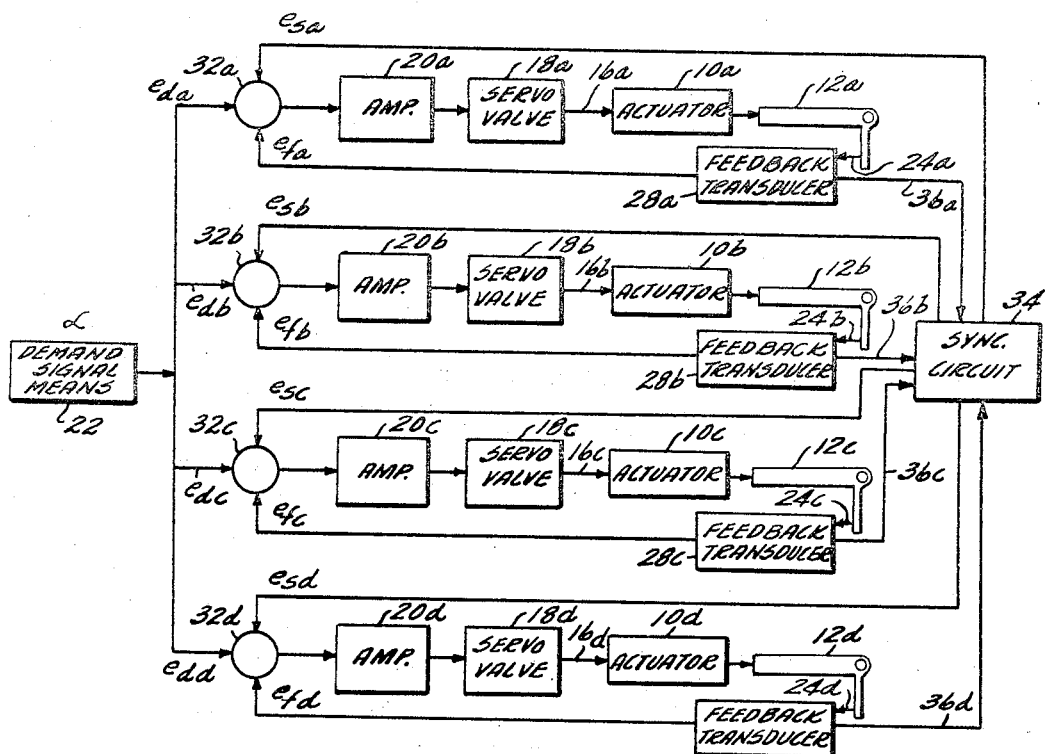

April 16, 1968

W. R. SPENCER ETAL 3,377,924

SYNCHRONIZING CONTROL CIRCUIT

Filed March 2, 1965

INVENTORS
WILLIAM R. SPENCER
DAVID E. THOMAS
BY

ATTORNEY

United States Patent Office 3,377,924
Patented Apr. 16, 1968

3,377,924
SYNCHRONIZING CONTROL CIRCUIT
William Ralph Spencer, Springdale, and David Everett Thomas, Cincinnati, Ohio, assignors to General Electric Company, a corporation of New York
Filed Mar. 2, 1965, Ser. No. 436,598
3 Claims. (Cl. 91—171)

The present invention relates to improvements in control systems.

The object of the invention is to provide a simple, accurate, and reliable control system for synchronizing the operation of power driven actuators such as fluid motors.

In accordance with the novel aspects of the present invention a control system is provided for synchronizing a plurality of actuators where each actuator is connected to a power source and has separate means for controlling the power input thereto. Means connected to each actuator produce an electrical signal reflecting the position of the actuator. These signals have a predetermined relationship, one to the other, when movement of the actuators is properly synchronized. Means responsive to a deviation of these signals from said predetermined relationship, reflecting an asynchronous relation between said actuators, are provided for varying the power input means to establish a synchronous relation between the actuators.

The above and other related objects and features of the invention will be apparent from a reading of the following description of the disclosure found in the accompanying drawing and the novelty thereof pointed out in the appended claims.

Figure 2:
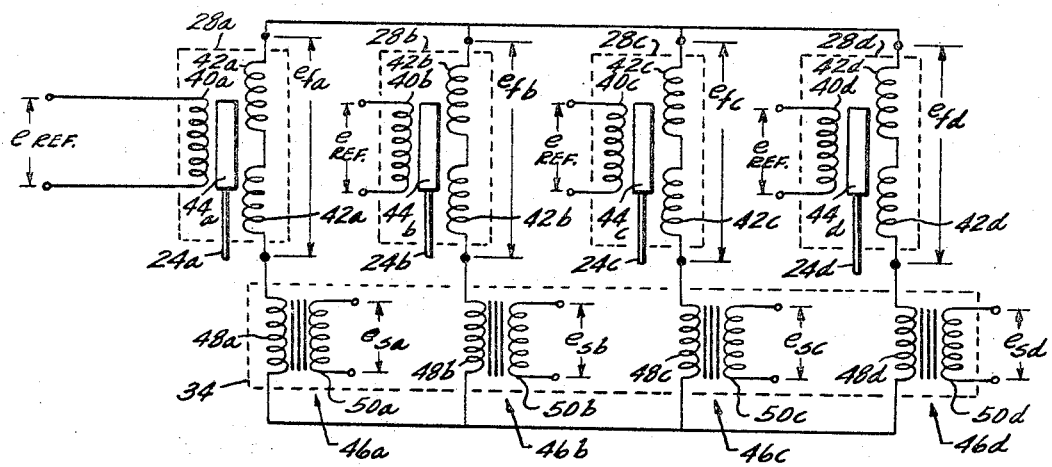

In the drawing:

FIG. 1 is a block diagram of a control circuit embodying the present invention; and FIG. 2 is a schematic circuit diagram of the preferred synchronizing means which are employed.

FIG. 1 shows in block diagram form a control circuit in which the present invention is embodied. For the sake of illustration, this control circuit is employed to control the exit nozzle area opening of a jet engine. For the sake of compactness and efficient design, the movable flaps which define the nozzle area opening are controlled by four separate actuators 10 in the form of fluid motors connected by linkages 12 to the flaps (not shown). Each actuator is connected to a source of pressurized hydraulic fluid by a servo valve 14 which controls the direction and rate of fluid flow. The connection between each valve and actuator is indicated by line 16. (Subscripts $a$, $b$, $c$ and $d$ are used to differentiate between duplicated parts but are not referred to except where required for clarity.) The servo valves are each positioned by electro-magnetic means derived from an amplifier 18. The electro-magnetic connection to the servo valves is indicated by line 20.

During operation of a turbojet engine various conditions require a change in the jet nozzle opening, and known means, indicated at 22, are employed to provide a demand signaled $e_d$ to each of the amplifiers 20. The demand signal causes a control signal $e_c$ to be fed to each of the amplifiers which in turn causes displacement of the servo valves so that hydraulic fluid will pass to the actuators, in the direction required, to displace the flaps to either reduce or enlarge the jet nozzle area in accordance with operating conditions.

It is an accepted practice in such control systems to provide means for halting operation of the actuators once the flaps controlled thereby have been displaced to the position called for by the demand signal. Thus it will be seen that arrow 24 indicates a mechanical connection between the actuator, specifically the linkage 12 operated thereby, and a transducer 28 which provides a feedback signal $e_f$ transmitted along line 30 to a summation point 32, where it is compared with the demand signal. When the demand signal and the feedback signal are equal (and of opposite polarity), the nozzle flaps have been displaced to the position called for. At this point, the control signal $e_c$ will be nulled out, and the servo valve is then positioned so that there is no further flow of hydraulic fluid to the actuator.

The present invention recognizes that with a plurality of actuators in operation, one or another may lead or lag due to various reasons, as for example unbalanced frictional forces acting on the linkages displaced thereby. If the difference in rates of movement and relative displacement of the various actuators gets too great, difficulties can be encountered with further increased frictional resistance and/or binding of the linkage elements. It is, therefore, desirable to synchronize the movement of the actuators. To this end a synchronizing circuit 34 is provided. This synchronizing circuit is electrically connected as indicated by line 36 to each position feedback transducer 24 and develops a synchronizing signal $e_s$ when movement of the actuators 10 is not synchronized. Such synchronizing signal is transmitted to the summation point 32, by a line 38, where it is also compared with the demand signal and the position feedback signal $e_f$. By further summing the synchronizing signal with the demand and position feedback signals, the feedback signal $e_f$ of a lagging actuator will add to the demand signal $e_d$ and the control signal $e_c$ will be appropriately strengthened to cause an increase in the flow of hydraulic fluid to return the actuators to a synchronous relation. Similarly, a leading actuator will create a feedback signal which can reduce the power input to establish a synchronous relation.

FIG. 2 illustrates the preferred form of positional feedback transducer 28 and the means for generating the synchronizing signals $e_s$. Each of the feedback transducers 28 comprises a primary winding which is energized by a reference voltage input $e_{ref}$. These transducers further comprise a pair of series opposed secondary windings 42 which are simply referred to a single secondary. A movable core 44 is displaced in response to movement of the actuator 10 through the mechanical connection 24. The position of the core 44 determines the voltage, $e_f$, developed across the secondary 42 which in turn reflects the position of the linkage controlled by the actuator. It is conventional practice to relate the output developed across the secondary 42, i.e. feedback signal $e_f$ to the demand signaled $e_d$, so that they will be nulled out when the position called for by the demand signal is reached by the actuator.

The synchronizing circuit comprises a transformer 46 connected to each transducer 28. Specifically each secondary 42 is connected in series with the primary 48 of the transformer 46 associated therewith. Each series connected secondary 42 and primary 48 is connected in parallel with the others. Thus, if the actuators are moving in synchronism, the relative position of the several cores 42 will each be the same and the voltage signals $e_f$ developed across the several secondaries 42 will be identical, and there will be no current flow between the parallel branches of this circuit. However, assuming that the voltage across the first circuit is greater than in the remaining branches, then $e_{fa}$ will be greater than $e_{fb}$, $e_{fc}$, and $e_{fd}$ and there will be current flow in all of the branches. This current flow between the parallel branches of the circuit induces a voltage in each of the secondaries 50 of the transformers 48 generating synchronizing signals $e_s$.

Assuming that current flow in the parallel branches of the FIG. 2 circuit is caused by the actuator $10_a$ lagging, the actuators $10_b$, $10_c$, and $10_d$, which are otherwise synchronized, a signal $e_{sa}$ will be generated which will add to the signal $e_{da}$, causing a strengthened signal $e_{ca}$ which will increase the rate of flow of hydraulic fluid to the actuator $10_a$, tending to bring it into a synchronized relation with the remaining actuators. At the same time, synchronizing signals $e_{sb}$, $e_{sc}$, and $e_{sd}$ will be generated which are 180° out of phase with the signal $e_{sa}$ and also one third the strength. The signals $e_{sb}$, $e_{sc}$, and $e_{sd}$ will be opposed to the signals $e_{db}$, $e_{dc}$, and $e_{dd}$, causing a reduced rate of flow of hydraulic fluid to the actuators $10_b$, $10_c$, and $10_d$. Thus the lagging actuator is accelerated while the remaining actuators are retarded to effectively establish or re-establish a synchronized relation between all of the actuators.

It will be apparent that more than one actuator may be out of synchronous relation and that the synchronizing signals $e_{sa}$, $e_{sb}$, $e_{sc}$, and $e_{sd}$ may all have different values, tending to retard and accelerate the actuators to establish the desired synchronous relation.

While the specific diagram illustrates the use of means which generate alternate current synchronizing signals, other signal generating means could be employed within the broader scope of the invention which is to be derived solely from the following claims.

Having thus described the invention, what is claimed as novel and desired to be secured by Letters Patent of the United States is:

1. A control system for synchronizing a plurality of actuators each connected to a power source and each having separate means for controlling the power input thereto, means providing a demand signal actuating said power input means to displace said actuators in a desired direction toward a desired position, means connected to each actuator for producing an electrical signal reflecting the position of said actuator, means for comparing said positional signals with said demand signal and de-actuating said power input means when a predetermined relation therebetween indicates the desired position has been reached, said positional signals also having a predetermined relationship one to the other when movement of said actuators is properly synchronized and means responsive to a deviation of said positional signals from said predetermined relationship, reflecting an asynchronous relation between said actuators, for varying the power input means to establish a synchronous relation between all of said actuators.

2. A control system for synchronizing movement of a plurality of actuators, each connected to a power source and each having separate means for controlling the power input thereto, a positionally variable transducer connected to each actuator, each transducer comprising a primary winding connected to a reference voltage and a secondary winding, with a core movable in accordance with actuator movement to provide a correspondingly varying voltage across the secondary winding reflecting the position of said actuator, a transformer, associated with each of said transducers, for producing a synchronizing signal, the primary of each synchronizing transformer being connected in series with the secondary of the associated transducer and each of said series connected transducer secondaries and transformer primaries being connected in parallel with each other whereby if there are differences between the voltages developed in the several transducer secondaries, current will flow between these parallel connected branches and an output voltage will be generated in each secondary of the synchronizing transformers, each of said power input means being connected to the secondary of the synchronizing transformer secondary associated with the transducer to which that control means is responsive and said power input control means being further responsive to the voltages developed in the synchronizing transformer secondary to which it is connected to vary the power input to the actuators to establish a synchronous relation between the actuators.

3. A control system for synchronizing movement for a plurality of actuators, each connected to a power source and each having separate means for controlling the power input thereto, said input control means being responsive to electrical voltage signals, means for imposing a common demand signal on each control means indicative of a desired position to which all of the actuators should be displaced, a positionally variable transducer connected to each actuator and producing a position feedback signal which is summed with and modifies the demand signal to each control means to thereby indicate that the actuator has been displaced to the desired position, each transducer comprising a primary winding connected to a reference voltage, a secondary winding and a core movable in accordance with actuator movement to provide a correspondingly varying voltage across the secondary winding reflecting the position of said actuator, a transformer associated with each of said transducers for producing a synchronizing signal which is summed with the demand and position feedback signals to modify the control means when movement of the actuators is not synchronized, the primary of each synchronizing transformer being connected in series with the secondary of the associated transducer and each of said series connected transducer secondaries and transformer primaries being connected in parallel with each other, whereby if there are differences between the voltages developed in the several transducer secondaries, current will flow between these parallel connected branches and an output voltage will be generated in each secondary of the synchronizing transformers to provide the synchronizing signal which is summed with the demand and position feedback signals, said synchronizing signals increasing the summed signal to the control means of a lagging actuator and subtracting from the summed signal to a relatively leading transformer to thereby establish a synchronous relation between the actuators.

References Cited

UNITED STATES PATENTS

| | | | |
|---|---|---|---|
| 2,722,198 | 11/1955 | Macgeorge | 91—363 |
| 3,015,768 | 1/1962 | Hornfeck et al. | 91—363 |
| 3,039,513 | 6/1962 | Lasiewiez et al. | 91—171 |
| 3,095,783 | 7/1963 | Flindt | 91—363 |
| 3,136,224 | 6/1964 | Escobosa | 91—367 |

FOREIGN PATENTS 630,968  11/1961  Canada.

MARTIN P. SCHWADRON, *Primary Examiner.*

PAUL E. MASLOUSKY, *Examiner.*